United States Patent [19]

Able et al.

[11] Patent Number: 5,144,793
[45] Date of Patent: Sep. 8, 1992

[54] INTEGRATED CONNECTOR/AIRTUBE FOR A TURBOMACHINE'S COMBUSTION CHAMBER WALLS

[75] Inventors: Edward C. Able, Tolland; Martin J. Gibler, Manchester, both of Conn.

[73] Assignee: United Technologies Corporation, Hartford, Conn.

[21] Appl. No.: 632,849

[22] Filed: Dec. 24, 1990

[51] Int. Cl.⁵ .......................... F23R 3/08; F02C 3/14
[52] U.S. Cl. ..................................... 60/39.32; 60/757
[58] Field of Search ...................... 60/39.32, 752, 757, 60/753, 759, 39.31

[56] References Cited

U.S. PATENT DOCUMENTS

| | | | |
|---|---|---|---|
| 2,609,040 | 9/1952 | Aronson | 60/757 |
| 3,385,054 | 5/1968 | Land | 60/757 |
| 4,302,941 | 12/1981 | DuBell | 60/757 |
| 4,422,300 | 12/1983 | Dierberger et al. | 60/753 |
| 4,720,979 | 1/1988 | Mink | 60/752 |
| 4,748,806 | 6/1988 | Drobny | 60/752 |
| 4,805,397 | 2/1989 | Barbier et al. | 60/39.32 |

FOREIGN PATENT DOCUMENTS 0136071  4/1985  European Pat. Off. ............. 60/753

Primary Examiner—Richard A. Bertsch
Assistant Examiner—Timothy S. Thorpe

[57] ABSTRACT

A structural connector (40) is disclosed for joining together the inner (30) and outer (22) walls of a combustion chamber (20) of a turbomachine (10), such as a gas turbine engine. The structural connector (40) also provides for cooling or combustion airflow between the combustion chamber (20) and a surrounding atmosphere (12). An outer end (42) of the connector (40) is releasably affixed to the outer wall (22) of the combustion chamber (20) while an inner end (48) is allowed limited lateral and axial displacement relative to the inner wall (30) of the combustion chamber (20), thereby accommodating differential expansion and contraction of the walls (30, 22) relative to each other.

3 Claims, 2 Drawing Sheets

INTEGRATED CONNECTOR/AIRTUBE FOR A TURBOMACHINE'S COMBUSTION CHAMBER WALLS

The Government has rights in this invention pursuant to a contract awarded to the assignee by the Department of the Air Force.

DESCRIPTION

1. Technical Field

This invention relates generally to turbomachines and more particularly to a combustion chamber used therein.

2. Background Art

Turbomachines, such as those used in numerous aircraft applications, require a continuous flow of air through and around the machine to meet both combustion process needs and cooling needs.

The internal combustion process of a turbomachine requires ingestion of a continuing and calculable airflow. Airflow intake by the turbomachine is then followed by the sequential operations of controlled compression of the airflow, introduction of the airflow to and mixture with a gaseous or liquid fuel, and subsequent ignition and combustion of the compressed mixture. The resulting gaseous product is then directed axially toward one or more stages of turbines located downstream of the combustion chamber. The turbines convert the expanding heated gases into shaft horsepower for driving engine accessories, compressor, and a fan or propeller.

The combustion process of a turbomachine can produce temperatures of approximately 3000° F. (approximately 1650° C.) at a region axially downstream of the combustion chamber adjacent the inlet of the first turbine stage. Protection of adjacent engine components from such high temperatures is typically accomplished by the use of cooling air. Cooling air may be employed in a number of ways to achieve this goal.

One cooling technique requires directing a flow of air through the annular volume formed between the double walls of the combustion chamber, thereby providing significant convective cooling for the inner wall of the chamber. It is also known to direct a portion of the air cooling flow from its annular volume over the hot surface of the inner wall to establish a layer of cool air adjacent the surface for further protection from the high temperature gases.

A consideration in combustion chamber wall design is the wall-connecting fasteners of the combustion chamber must provide not only structural support to the paired wall members but also must accommodate shifting of the wall members relative to each other due to thermal expansions and contractions of the combustion chamber.

SUMMARY OF THE INVENTION

It is an object of the present invention to provide an improved structural connector for joining together the walls of a combustion chamber used in a gas turbine engine.

It is another object of the present invention to provide an improved structural connector for joining together the walls of a gas turbine's combustion chamber wherein the improved connector also serves as a conduit for airflow between the combustion chamber and its external atmosphere, wherein such airflow is desirable for the dilution requirements of the internal combustion process conducted therein.

It is yet another object of the present invention to provide an improved structural connector for joining together the walls of a gas turbine's combustion chamber wherein the improved connector accommodates thermal expansions and contractions of the chamber walls relative to each other.

It is a further object of the present invention to provide a joining structure for the walls of a combustion chamber which reduces the number of perforations through the chamber's wall portions which heretofore have been necessary for structural attachment purposes.

These and other objects will become apparent in the further course of this disclosure.

The present invention provides a structural connector for joining together the inner and outer walls of a combustion chamber of a turbomachine. This structural connector also provides for dilution air passage through and between the connector's ends which are open to atmospheres internal and external to the combustion chamber. This structural connector/air conduit will henceforth be termed "airtube".

The open outer end of the airtube is releasably affixed to the outer wall of the combustion chamber while the open inner wall of the airtube is allowed limited displacement relative to the inner wall of the combustion chamber. Lateral displacement of the inner end of the airtube relative to the inner wall of the combustion chamber is limited by a radial clearance between an outer circumference of the airtube's inner end and an inner circumference of a receiving orifice in the inner wall in which the inner end is installed. An axial component of displacement of the inner wall toward the outer wall is limited by a radially outwardly extending shoulder disposed on the airtube. The displacement limitations of the present invention accommodates differential expansion and contraction of the combustion chamber walls relative to each other. The flush geometry of the airtube's inner end relative to the inner wall of the combustion chamber provides for thin-film cooling airflow across the inner wall.

This invention provides significant advantages over the prior art. Significant airflow into the combustion chamber is provided by the enablement of airflow through an airtube which also provides structural support for adjacent combustion chamber walls, the assemblage readily releasable at one end of the airtube. In addition, the objects of this invention are achieved through the use of this improved airtube which accommodates expansion and contraction of the inner and outer walls, thereby eliminating a source of stress in and between the walls and the airtube.

DETAILED DISCLOSURE

Figure 1:
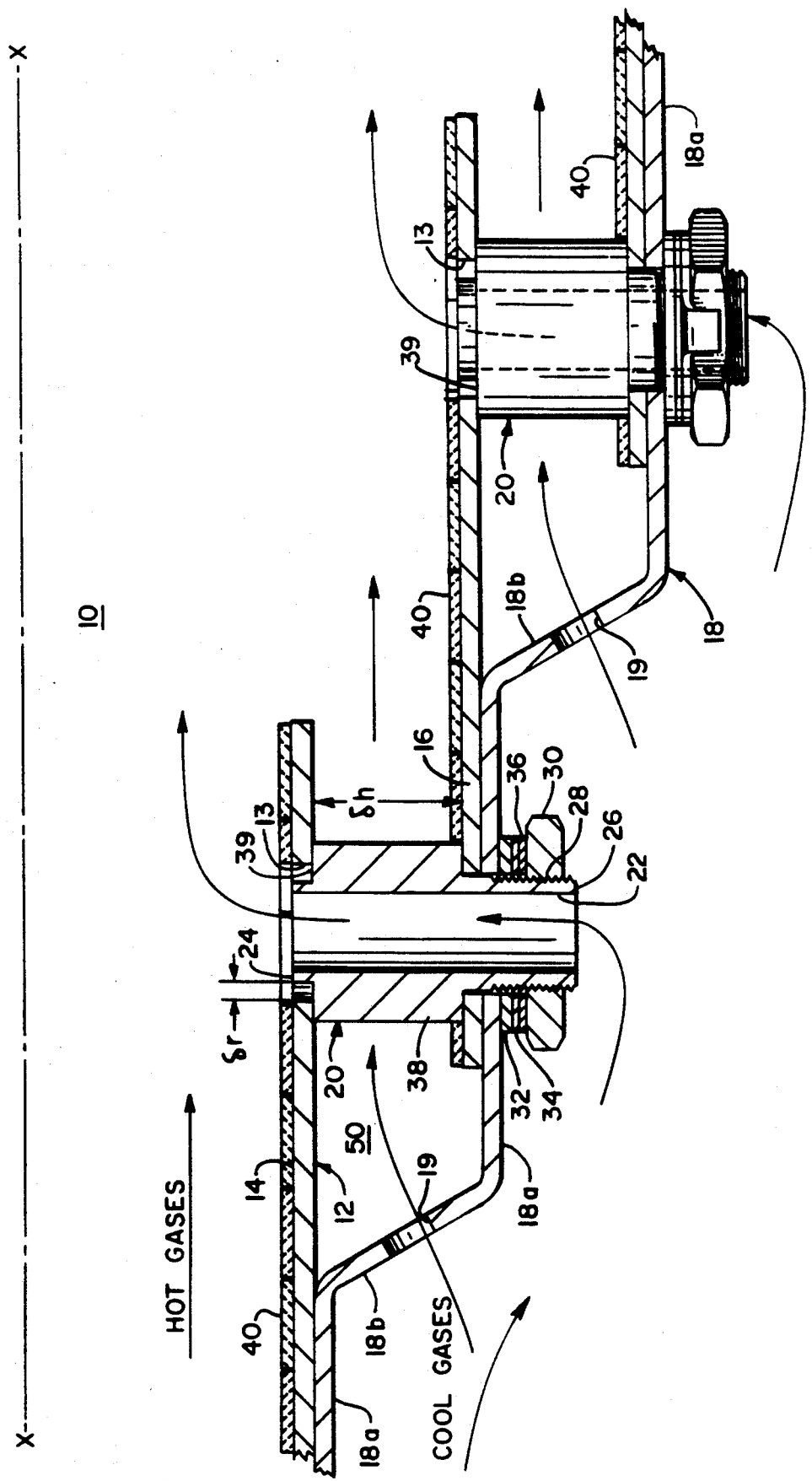
FIG. 1 is a cross-sectional view of the arrangement of the airtube installed between cooperating combustion chamber walls, according to the present invention.

Referring to FIG. 1, the invention shown is an airtube 20 for joining, in spaced relationship, the inner and outer segmented walls 12, 16 of a combustion chamber 10 of a turbomachine (not shown). The outer wall 16 is disposed about a first axis of the combustion chamber 10, the first axis generally coincidental with the turbomachine's longitudinal axis X—X. The inner wall 12 is disposed radially inwardly from the outer wall 16 to form an annular volume 50 therebetween. It is through this annular volume 50 created by the inner and outer walls 12, 16 through which cooling air is directed as will be more fully described below. The inner wall 12 includes an inner wall surface 14 which faces the hot side of the combustion chamber 10. This inner wall surface 14 will henceforth be termed "hotside" 14.

Figure 2:
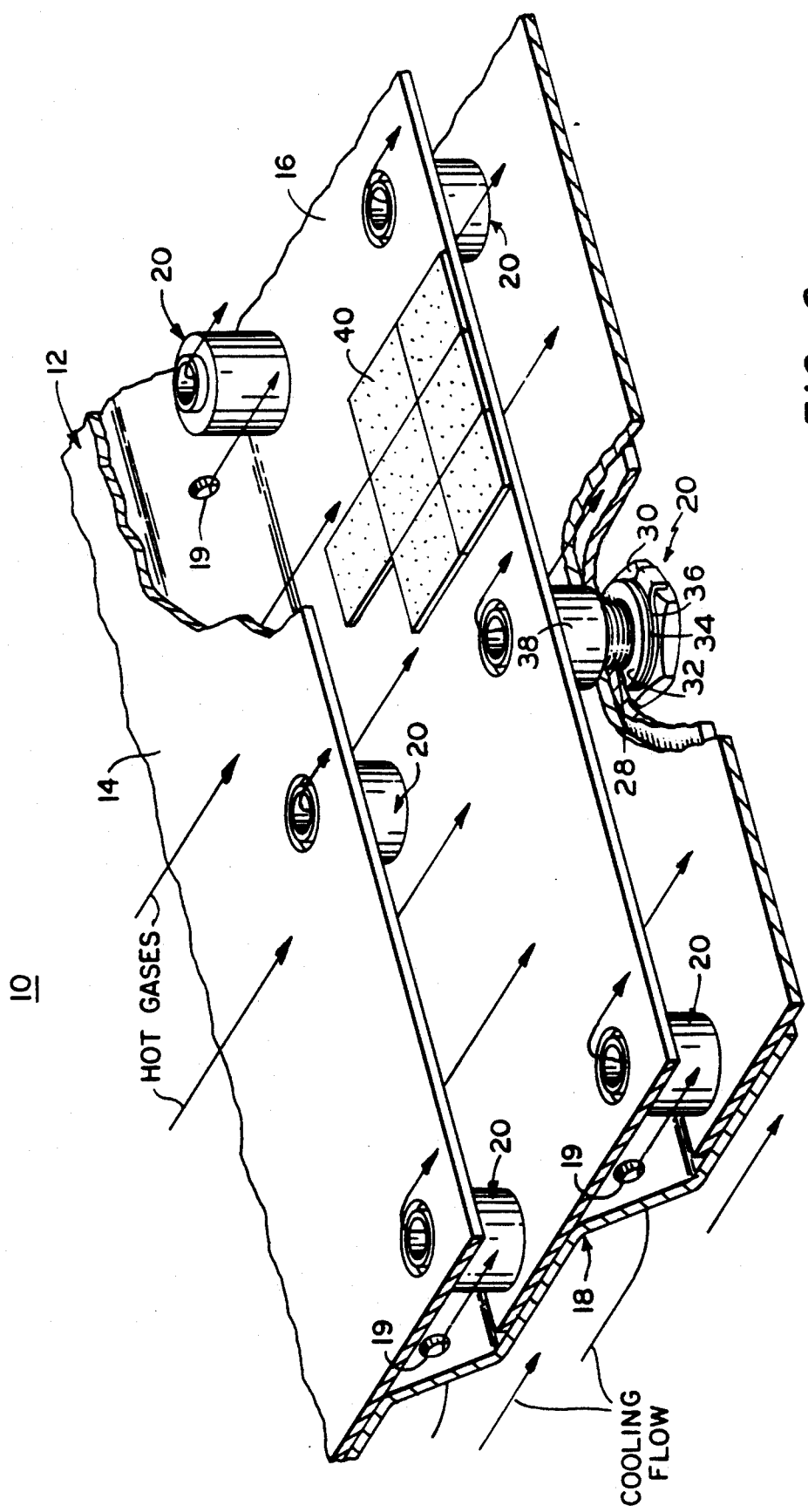
FIG. 2 is an isometric view of an assembled portion of the turbomachine's combustion chamber.

The inner and outer walls 12, 16 are supported by a combustion chamber supporting wall 18. The supporting wall 18 has a staircase-like configuration comprising a plurality of approximately horizontal steps 18(a), wherein each pair of horizontal steps 18 (a) is connected together with an approximately vertical riser 18(b). The risers 18(b) of the supporting wall 18 may be substantially angularly skewed from a perpendicular orientation with one or both proximately disposed horizontal steps 18(a). A plurality of air vents 19 are disposed through the risers 18(b). The inner and outer walls 12, 16, which may be circumferentially and/or radially segmented, are secured in a cascade or shingle type arrangement to the horizontal steps 18(a) of the supporting wall 18. This cascade arrangement, relative to the longitudinal axis of the combustion chamber 10, is shown in FIG. 2. Cooling air is directed through the airtubes 20 and the vents 19 of the supporting wall 18 in a downstream direction relative to the combustion chamber 10, thereby providing dilution air and thin-film cooling along the hot walls 14, through the annular volume disposed between the walls 12, 16, and through the combustion chamber 10. A like second cascade arrangement of the airtube 20 and the walls 12, 16, 18 is arrayed substantially parallel with the first cascade arrangement to bound a gas path, wherein both cascade arrangements are concentrically disposed about the longitudinal axis X—X.

Referring again to FIG. 1, the airtube 20 of the present invention functions both as a structural connector between the inner wall 12 and the outer wall 16 and as a conduit for airflow between an atmosphere external to the combustion chamber 10 and the combustion chamber environment. The airtube 20 is sized as required for the necessary structural support of the walls 12, 16 and for cooling and combustion airflow requirements. The airtube 20 provides an inner wall end 24 for connection with the inner wall 12 of the combustion chamber, an outer wall end 26 for attachment to the outer wall of the combustion chamber 10 and a radially outward extending shoulder 38 disposed between the inner wall end 24 and the outer wall end 26.

The airtube 20 also provides an airtube cavity disposed therethrough in the form of a longitudinal passage useful for fluid conduction between the inner end 24 and the outer end 26. The inner wall end 24 is in communication with the combustion chamber environment. The outer wall end 26 of the airtube 20 is in communication with the surrounding atmosphere generally comprising gases cooler than that of the combustion chamber environment. According to the present invention, the airtube 20 is configured such that its longitudinal axis is generally perpendicular to the plane defined by the inner wall 12. As will be appreciated by those skilled in the art, angular orientation of the longitudinal axis of the airtube 20 relative to the planes of either or both walls 12, 16 will be deemed to be within the scope of this invention.

The outer wall end 26, which includes a threaded section 28, is releasably affixed to the outer wall 16 of the combustion chamber 10. A retaining nut 30 is used to capture the combustion chamber supporting wall 18 and the outer wall 16 against the retaining shoulder 38 of the airtube 20. Additional components used for spacing or locking such as a spacer 32, a wave washer 34 or a tab lock 36, may be used in the formation of a releasable connection therebetween. Other releasable connections as will occur to those skilled in the art are deemed to be within the scope of the instant invention.

The retention shoulder 38, which is radially disposed in an outwardly extending manner from the airtube 20, provides a land 39 for the inner wall 12 of the combustion chamber 10. The shoulder 38 also provides spacing between the inner wall 12 and the outer wall 16 characterized by a shoulder height $\delta h$. The shoulder height $\delta h$ defines the minimum clearance between the inner and outer walls 12, 16 of the combustion chamber 10 which may occur due to thermal gradients causing thermal expansion and contraction of the walls 12, 16. The shoulder 38 extends radially outward to a dimension greater than the orifice 13 in the inner wall 12 in which the inner wall end 24 is disposed. A radial clearance $\delta r$ characterizes the allowable displacement, due to thermal expansions and contractions, between an outer circumference of the inner wall end 24 relative to an inner circumference of the orifice 13 disposed in the inner wall 12. The sizing of the retention shoulder 38 and the inner wall orifice 13 provides sufficient overlap between the shoulder 38 and the inner wall 12 such that leakage of any airflow therethrough is minimized. That is, the inner wall 12 is allowed to "float" in the vicinity of the inner end 24 relative to the "fixed" structure of the connection made between the outer wall 16 and the outer end 26. The "float" allows for shifting of the inner wall 12 relative to the outer wall 16 and also reduces stress levels in the releasable connection of the outer wall 16 formed by the retaining nut 30 disposed on the threaded section 28 of the outer end 26 of the airtube 20.

The open inner wall end 24 of the airtube 20 is substantially flush with the hotside 14 of inner wall 12. In a like manner, the open inner wall end 24 may be further extended to become flush with an outer surface of a high temperature resistent liner panel 40 disposed on the hotside 14 of the inner wall 12 which is more fully described below.

Approximately 50 airtubes 20 per each pair of overlapping walls 12, 16 are utilized in an embodiment of the present invention. Each airtube 20 has an internal diameter of about 0.25"–0.75", a shell thickness of about 0.04 inch, and an overall length in the range of about 0.30 inch to about 0.60 inch. The threaded engagement length of the outer wall end 26 is about 0.20 inch. The airtube 20 is constructed of a high-temperature alloy such as Hastelloy-X.

In addition to the general construction of the combustion chamber 10 of the turbomachine through the utilization of a plurality of airtubes 22, another embodiment of this invention employs high temperature liner panels 40 attached to the hotside 14 of the inner wall 12 of the combustion chamber 10. These liner panels 40 may be of a high-temperature-resistant material such as a ceramic. Alternatively, a ceramic coating may be disposed on a metallic carrier which is connected to the inner wall 12, as practiced in the Floatwall TM construction used in the combustion chambers of some Pratt & Whitney aircraft engines. In this embodiment, a downstream portion of a Floatwall TM segment partially overlaps the subsequent downstream wall segment in a cascade or shingle type arrangement, thus protecting the leading edge of the subsequent segment and any exposed heads of any fasteners used to attach that downstream segment to the underlying wall 12, 16.

Given the above, the following method is disclosed for the assembly and securing of a plurality of wall segments for the fabrication of a combustion chamber 10 of a turbomachine (not shown) utilizing the airtube 20 of the instant invention. This method contemplates the assemblage of the inner wall means 12 disposed radially inwardly of the outer wall means 16 thereby forming an annular volume therebetween. The airtube 20 is disposed in a spaced relationship between the inner and outer walls 12, 16 and provides for fluid communication between the environment external to the outer wall 16 and the combustion chamber environment disposed radially inwardly of inner wall 12. The outer wall end 26 of the airtube 20 is releasably affixed to the outer wall 16. Means for limiting axial displacement of the inner wall 12 relative to the outer wall 16 is also provided.

Further modifications and improvements of the invention herein disclosed will occur to those skilled in the respective arts and all such modifications and improvements are deemed to be within the scope of the invention as defined by the appended claims.

What is claimed is:

1. A wall arrangement for a combustion chamber having a flow of hot gaseous combustion products therethrough, comprising:
   a supporting wall having a staircase-like configuration in the direction of the flow of the products, the supporting wall including a plurality of alternating steps and angularly skewed risers;
   a plurality of segmented walls, each segmented wall secured to a corresponding step of the supporting wall and extending downstream therefrom, each segmented wall extending downstream past the downstream adjacent riser and overlapping the next downstream segmented wall secured to the next downstream step; and
   an airtube disposed about an axis extending between the overlapping portion of one of the plurality of segmented walls and the next downstream step and corresponding next downstream wall, said airtube having an outer end extending through first and second aligned holes disposed in the next downstream step and next downstream segmented wall, and having an inner end aligned with a third hole disposed in the overlapping portion of the one segmented wall,
   said airtube further including:
   a shoulder extending radially with respect to the axis and located between the one overlapping segmented wall portion and the next segmented wall, the shoulder having a radial dimension greater than the first, second and third holes,
   a longitudinal passage extending axially through the airtube and
   means disposed on the side of the supporting wall opposite the corresponding next segmented wall, for releasably secured the outer end of the airtube to the supporting wall.

2. The wall arrangement as recited in claim 1 wherein the axial dimension of the shoulder defines a minimum separation between the overlapping segmented wall portion and the next segmented wall.

3. The wall arrangement as recited in claim 1 wherein the securing means comprises a threaded configuration on the airtube outer end and a retaining nut engaged therewith.

* * * * *